United States Patent

Miyazawa et al.

Patent Number: 5,331,365
Date of Patent: Jul. 19, 1994

[54] CAMERA SHAKING DETECTION APPARATUS

[75] Inventors: Azuma Miyazawa; Takeshi Ito, both of Tokyo, Japan; Yoichi Yoshida, Bethpage, N.Y.

[73] Assignee: Olympus Optical Co., Ltd., Tokyo, Japan

[21] Appl. No.: 66,585

[22] Filed: May 21, 1993

[30] Foreign Application Priority Data

Oct. 15, 1990 [JP] Japan .................................. 2-275969
Nov. 21, 1990 [JP] Japan .................................. 2-318417

[51] Int. Cl.$^5$ .......................... G03B 7/00; G03B 29/00
[52] U.S. Cl. ................................... 354/410; 354/430; 354/62
[58] Field of Search ............... 354/476, 430, 62, 202, 354/410, 219

[56] References Cited

U.S. PATENT DOCUMENTS

| | | | |
|---|---|---|---|
| 4,503,325 | 3/1985 | Araki | 250/204 |
| 5,036,347 | 7/1991 | Tsunekawa et al. | 354/62 X |
| 5,138,354 | 8/1992 | Okada | 354/219 X |
| 5,200,774 | 4/1993 | Nakajima | 354/62 |
| 5,255,026 | 10/1993 | Arai et al. | 354/62 X |

FOREIGN PATENT DOCUMENTS

| | | |
|---|---|---|
| 52-147423 | 12/1977 | Japan . |
| 57-482 | 1/1982 | Japan . |
| 61-150580 | 7/1986 | Japan . |
| 62-47012 | 2/1987 | Japan . |
| 62-27685 | 6/1987 | Japan . |

Primary Examiner—Michael L. Gellner
Assistant Examiner—Jae N. Noh
Attorney, Agent, or Firm—John P. White

[57] ABSTRACT

A light-emitting element is arranged in a camera body to emit light toward part of the face of a user. A light-receiving element receives light reflected by the face. A detection unit detects shaking of the camera body on the basis of a change in photocurrent from the light-receiving element. The light-emitting element and the light-receiving element may be arranged as an eyeball detection unit for detecting the position of the eyeball of the user.

2 Claims, 12 Drawing Sheets

CAMERA SHAKING DETECTION APPARATUS

BACKGROUND OF THE INVENTION

1. Field of the Invention

The present invention relates to a camera shaking detection apparatus and, more particularly, to a camera shaking detection apparatus for detecting occurrence of camera shaking during photography with a camera. For example, the present invention relates to a camera shaking detection apparatus for detecting camera shaking by utilizing part of a face of a user, such as eyeball position detection of the user.

2. Description of the Related Art

Conventional camera shaking detection apparatuses used in cameras are an apparatus using an AF (autofocus) sensor, as described in Published Examined Japanese Patent Application Nos. 57-482 and 62-27685, an apparatus using an acceleration sensor, as described in Published Unexamined Japanese Patent Application Nos. 52-147423 and 62-47012, and an apparatus using an angular velocity sensor, as described in Published Unexamined Japanese Patent Application No. 61-150580.

In camera shaking detection using the AF sensor, a difference between image signals at two moments is obtained, and camera shaking is detected on the basis of this difference.

In camera shaking detection using the acceleration sensor, movement information such as rotation caused by camera shaking of a user who supports a camera is detected.

The apparatuses using the AF sensor, the acceleration sensor, and the angular velocity sensor have the following problems.

i) In the apparatus using the AF sensor for detecting an image error, the camera shaking adversely affects photography when the shutter speed is low (i.e., an object is dark). In this case, the integration time of the sensor is prolonged, and the response speed cannot cope with an actual detection speed.

In this apparatus, an object having a low contrast cannot be detected.

This apparatus cannot detect camera shaking in a TTL (through the lens) AF camera because a mirror is up in a shutter open state. In addition, processing is complicated.

ii) In the detection apparatus using the acceleration sensor, camera shaking generally has a low frequency, but the acceleration sensor cannot detect this low-frequency shaking.

In a sensor of this type, the sensor output is low, and noise tends to be superposed on the sensor signal. The sensor itself is expensive, and the system is complicated.

SUMMARY OF THE INVENTION

It is, therefore, an object of the present invention to provide a new and improved camera shaking detection apparatus in which camera shaking during an exposure operation can be detected with high precision, and more particularly, low-frequency shaking can be detected regardless of the camera shutter speed and contrast, the overall arrangement is inexpensive, processing and its system are not complicated, and the apparatus is as simple as possible.

According to an aspect of the present invention, there is provided a camera shaking detection apparatus comprising light-emitting means, arranged in a camera body, for emitting light on part of a user's face, light-receiving means for receiving light emitted from the light-emitting means and reflected by the user's face, and detecting means for detecting shaking of the camera body on the basis of a change in photocurrent in the light-receiving means.

In the camera shaking detection apparatus of this aspect of the present invention, an infrared LED as the light-emitting means and a photodiode as the light-receiving means are located at positions where light reflected by a relatively flat portion of the face of the user upon radiation of light from the infrared LED can be received by the photodiode. When shaking of the camera body occurs, the amount of light received by the photodiode changes. Therefore, the detecting means can easily detect camera shaking.

In order to achieve the above object according to another aspect of the present invention, there is provided a camera shaking detection apparatus comprising eyeball detecting means for detecting a position of an eyeball of a user, and camera shaking detecting means for detecting camera shaking on the basis of eyeball position information output from the eyeball detecting means.

In the camera shaking detection apparatus of this aspect, since camera shaking can be detected in accordance with a change in position of the eyeball, camera shaking detection can be accurately and stably performed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

Reference will now be made in detail to the presently preferred embodiments of the invention as illustrated in the accompanying drawings, in which like reference characters designate like or corresponding parts throughout the several drawings.

The first embodiment of the present invention will be described with reference to the accompanying drawings.

The human head portion including the face is a portion, which is least susceptible to shaking, in all parts of the human body. According to the present invention, the camera position relative to the position of the head portion including the face is optically detected to detect camera shaking.

Figure 1:
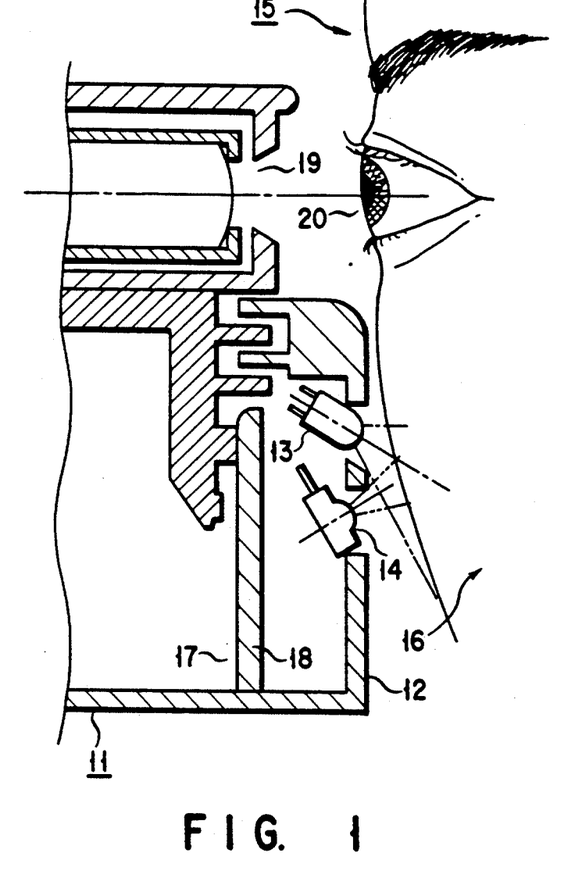
FIG. 1 is a view showing a camera to which a camera shaking detection apparatus according to the first embodiment of the present invention is applied, and the face of a user.

FIG. 1 shows a camera body 11 to which a camera shaking detection apparatus of the present invention is applied, and a face 15 of a user.

Referring to FIG. 1, an infrared light-emitting diode (LED) 13 and a light-receiving photodiode 14 are mounted in a rear cover 12 of the camera body 11 to be spaced apart from each other by a predetermined distance.

The infrared LED 13 and the photodiode 14 are mounted at adjacent positions in such a manner that light emitted from the infrared LED 13 is reflected by a cheek 16 of the face 15 of the user and can be received by the photodiode 14.

The infrared LED 13 and the photodiode 14 are arranged at positions opposite to the cheek 16 because the cheek 16 is a relatively flat portion of the face 15.

A film pressure plate 18 for pressing a film 17 is disposed inside the rear cover 12. Reference numeral 19 denotes a finder for guiding light from an object to be photographed to be caught by an eye 20 of the user.

Camera shaking detection of the camera shaking detection apparatus shown in FIG. 1 will be described below.

The amount of movement of the object to be photographed, caused by camera shaking, on the film surface is represented as follows:

$$\beta x + f\theta$$

where $\beta$ is the lateral magnification of a photographic optical system, x is the shift amount in a direction parallel to the film surface, which is caused by camera shaking, f is the focal length of the photographic optical system, and $\theta$ is the inclination angle of the photographic optical axis caused by shaking.

In this case, when an object is located at a position except for a position near the camera, since $\beta$ is almost zero, $f\theta$ is predominant over $\beta x$.

Figure 2A:
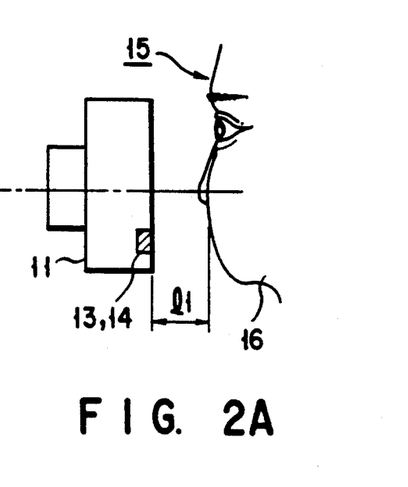
FIGS. 2A and 2B are views showing a camera shaking state of the camera in the camera shaking detection apparatus shown in FIG. 1.
Figure 2B:
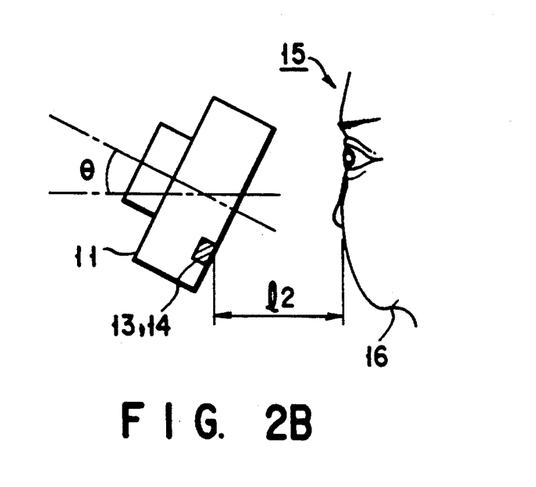

FIGS. 2A and 2B show a state of detection of the inclination angle $\theta$. First of all, as shown in FIG. 2A, assume that the camera body 11 is held to be spaced apart from the cheek 16 of the user by a distance $l_1$.

For the descriptive convenience, the infrared LED 13 and the photodiode 14 are indicated by the same position.

As shown in FIG. 2B, when the camera body 11 is rotated by shaking with respect to the state in FIG. 2A, the distance between the cheek 16 and the infrared LED 13 (photodiode 14) becomes $l_2$.

The state in FIG. 2A is different from the state in FIG. 2B in that the distance between the light-emitting/light-receiving system (i.e., the infrared LED 13 and the photodiode 14) and the cheek 16 is changed from $l_1$ to $l_2$, and the angle between the face 15 and the light-emitting/light-receiving system changes.

For this reason, a change in reflected light incident on the photodiode 14 serving as the light-receiving element apparently occurs.

The light-emitting and light-receiving elements are located at positions where an output from the photodiode 14 changes in accordance with the inclination angle $\theta$ of the camera body 11 with respect to the head, in particular, face of the user. The light-receiving element can thus generate an output in accordance with camera shaking.

For this reason, the light-emitting and light-receiving elements are preferably located at a relatively flat rear surface portion of the camera which causes a small change in infrared reflectance depending on the positions of the elements.

Figure 3A:
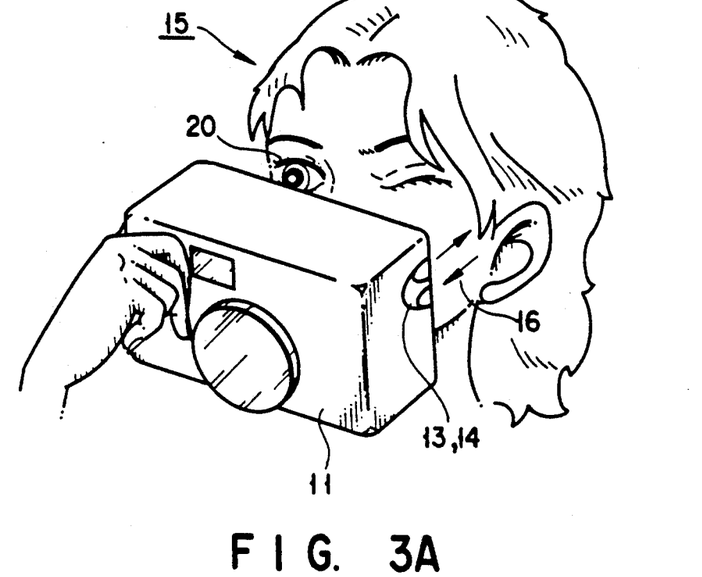
FIGS. 3A and 3B are views showing the layouts of a light-emitting element and a light-receiving element.
Figure 3B:
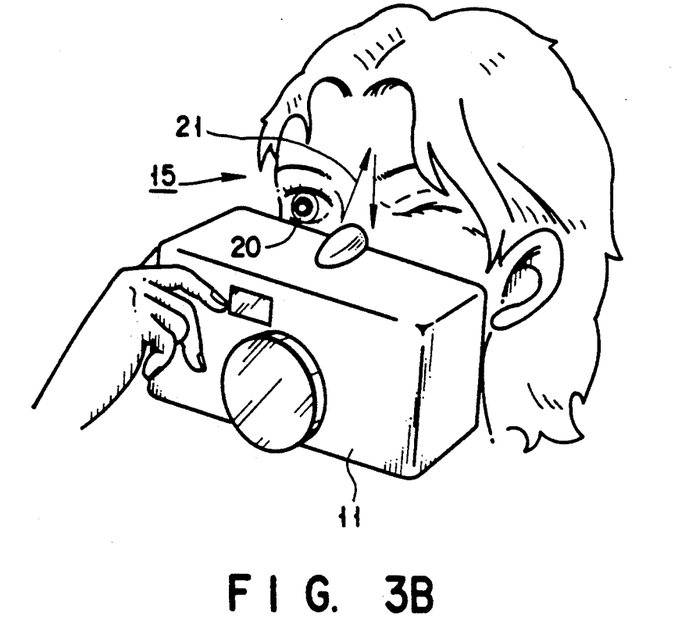

FIGS. 3A and 3B show the layouts of the light-emitting and light-receiving elements (i.e., the infrared LED 13 and the photodiode 14).

FIG. 3A shows the layout in which the infrared LED 13 and the photodiode 14 are located at positions where light is radiated on the cheek 16 of the face 15 of the user.

FIG. 3B shows the layout in which the infrared LED 13 and the photodiode 14 are located on the upper portion of the camera body 11 to radiate light on the portion of a forehead 21 of the face 15 of the user.

Figure 4:
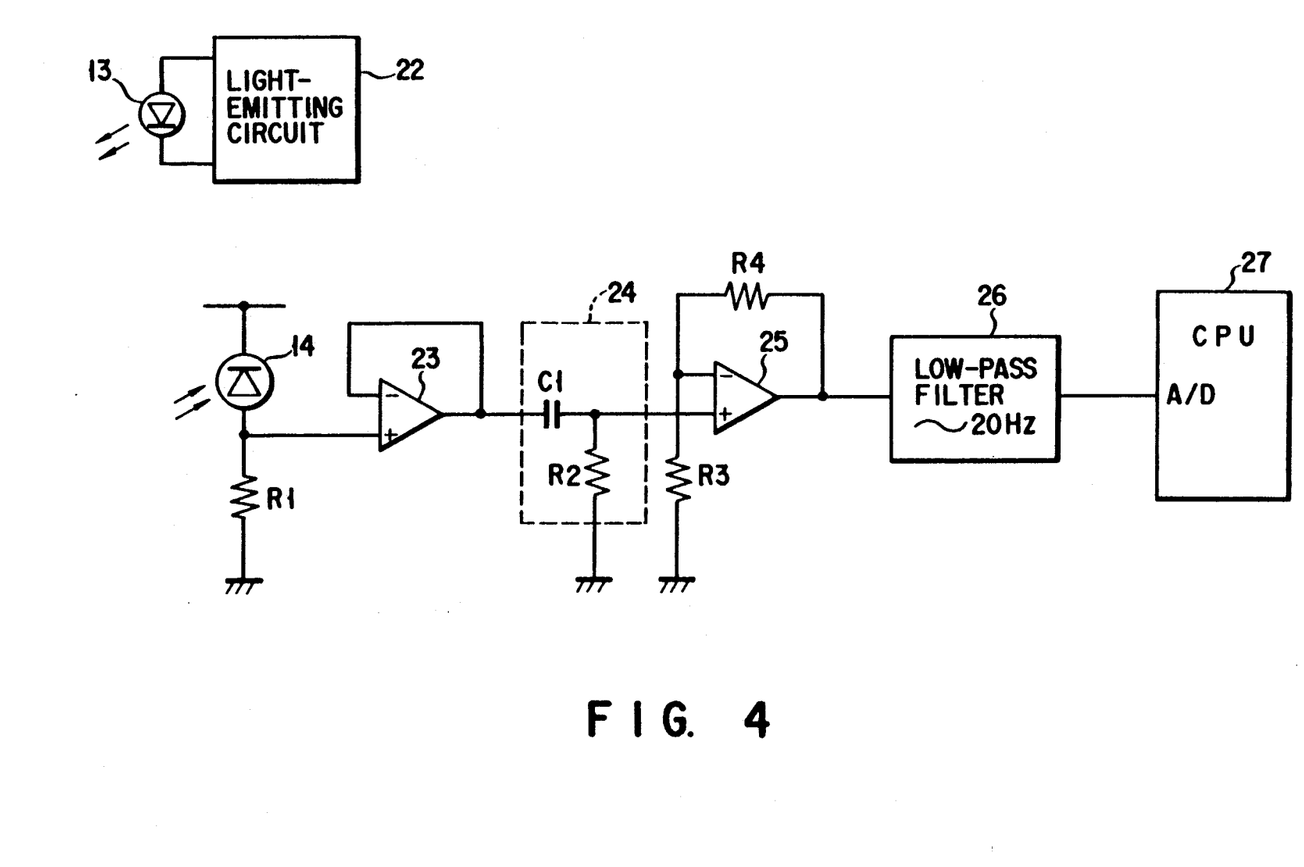
FIG. 4 is a schematic circuit diagram showing a processing circuit in the detection apparatus.

FIG. 4 shows a processing circuit of this detection apparatus.

Assume that the maximum shaking frequency is generally about 20 Hz and that the circuit shown in FIG. 4 amplifies a signal having a frequency of 20 Hz or less.

Referring to FIG. 4, light emitted from the infrared LED 13 driven by a light-emitting circuit 22 is received by the photodiode 14. A photocurrent from the photodiode 14 is input to a resistor $R_1$, and a change in voltage across the resistor $R_1$ is received by a buffer amplifier 23.

An output from the buffer amplifier 23 is input to a high-pass filter 24 constituted by a capacitor $C_1$ and a resistor $R_2$.

The high-pass filter 24 cuts off a DC component of the input. The high-pass filter 24 preferably has a minimum cutoff frequency to input a DC-cut signal to an amplifier 25.

A necessary component here is a change in amount of light received by the photodiode 14. A light component in a normal state is therefore cut off by this high-pass filter 24.

An output from the high-pass filter 24 is amplified by the amplifier 25 including resistors $R_3$ and $R_4$, and an output from the amplifier 25 is input to a low-pass filter 26. The low-pass filter 26 passes a signal component having a frequency of 20 Hz or less, and can remove, for example, noise of a fluorescent lamp or the like.

An output from the low-pass filter 26 is input to the A/D conversion terminal of a CPU (central processing unit) 27. The subsequent processing is performed.

Processing by the CPU 27 has been described in U.S. patent application Ser. No. 951,307 filed by the present applicant, and a detailed description thereof will be incorporated herein.

Figure 5:
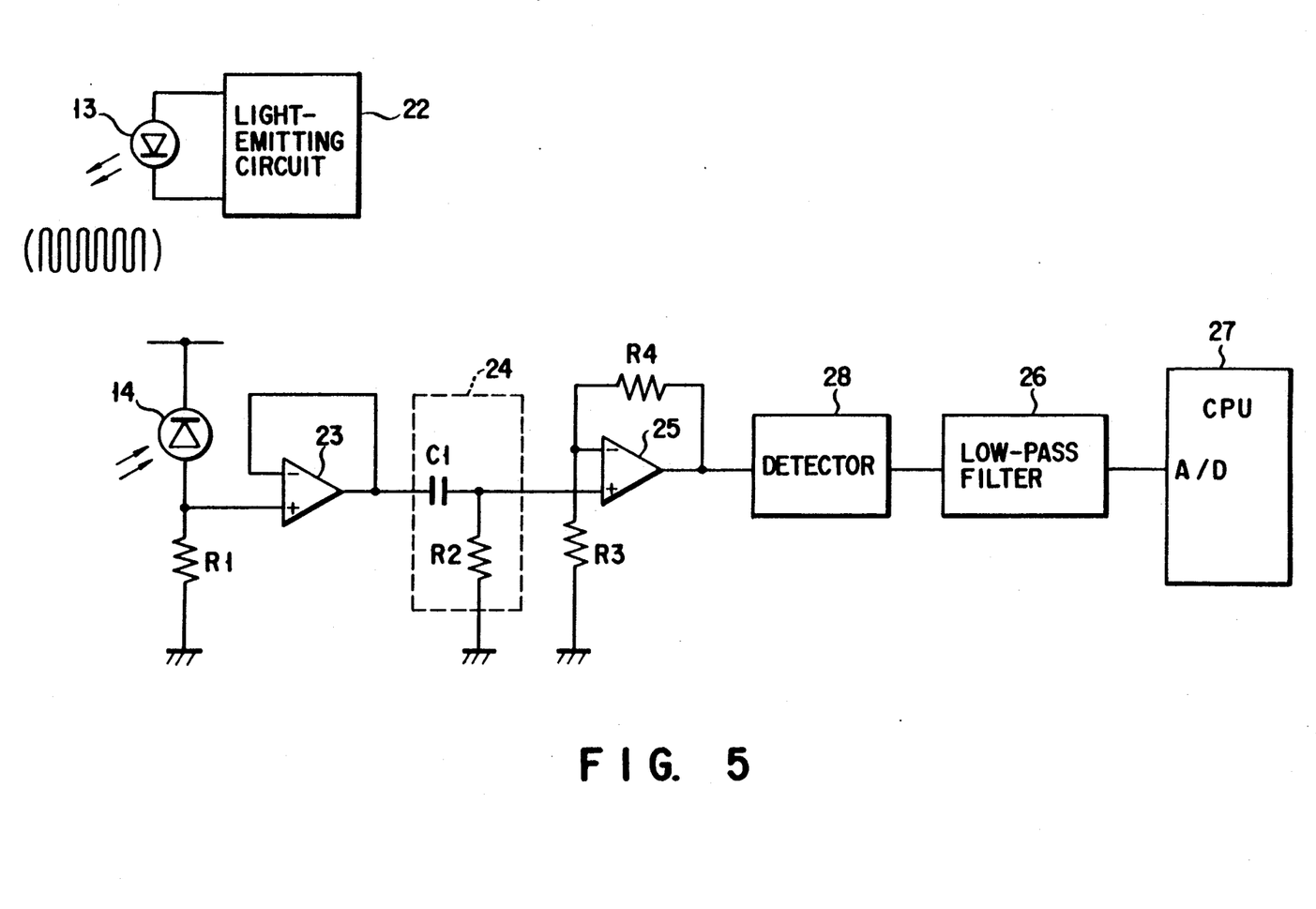
FIG. 5 is a schematic circuit diagram showing another processing circuit in the detection apparatus.

Emission from the infrared LED 13 in FIG. 4 is continuous emission, but the present invention is not limited to this. FIG. 5 shows a case in which an infrared output from the infrared LED is modulated.

More specifically, in the circuit shown in FIG. 5, the infrared LED 13 outputs a modulated signal, and a detector 28 is inserted between the amplifier 25 and the low-pass filter 26. According to this arrangement, even if noise light having fluctuations with a frequency of 20 Hz or less is incident, influences of the noise light can be eliminated.

As described above, a light-emitting element and a light-receiving element are arranged in a camera body and are located at positions where light emitted on a relatively flat portion of the face of the user can be received. Therefore, a change in amount of light received by the light-receiving element can be detected, thereby easily detecting camera shaking.

According to the first embodiment of the present invention, there is provided an inexpensive camera shaking detection apparatus capable of detecting low-frequency shaking regardless of the shutter speed and contrast, in which processing and its system are not complicated.

The second embodiment of the present invention will be described with reference to the accompanying drawings.

Figure 6:
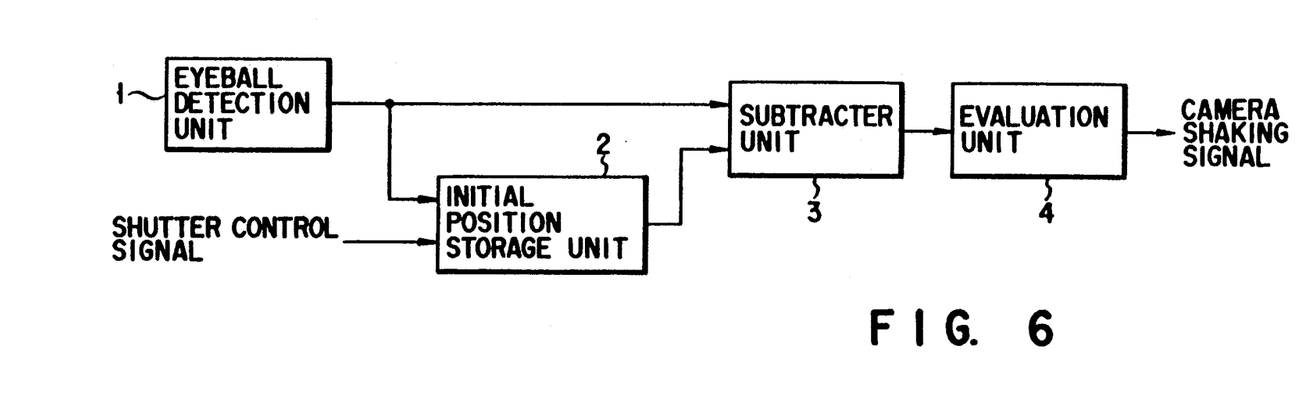
FIG. 6 is a block diagram showing the basic arrangement of a camera shaking detection apparatus according to the second embodiment of the present invention.

FIG. 6 shows the basic arrangement of a camera shaking detection apparatus according to the second embodiment of the present invention.

This camera shaking detection apparatus comprises an eyeball detection unit 1, arranged near, e.g., a finder of the camera, for detecting a camera position relative to an eyeball position, an initial position storage unit 2 for storing an initial position of the eyeball in synchronism with an opening operation of the shutter, a subtracter unit 3 for obtaining a difference between the initial position of the eyeball and the eyeball position during opening of the shutter or at the end of opening of the shutter, and an evaluation unit 4 for evaluating on the basis of a substraction result of the subtracter unit 3 whether camera shaking adversely affects a photographic result.

According to the second embodiment of the present invention, the eyeball position of the user is used as a parameter for detecting camera shaking.

A human eye generally relatively stably gazes the object to be photographed during exposure even if his or her head or camera body is vibrated. When the camera body shakes by a photographic operation of the user, the pupil of the eyeball is detected, and the position of the pupil of the eyeball is defined as an absolute position. The position of the camera body relative to this absolute position is obtained, thereby detecting shaking of the camera body.

Figure 7:
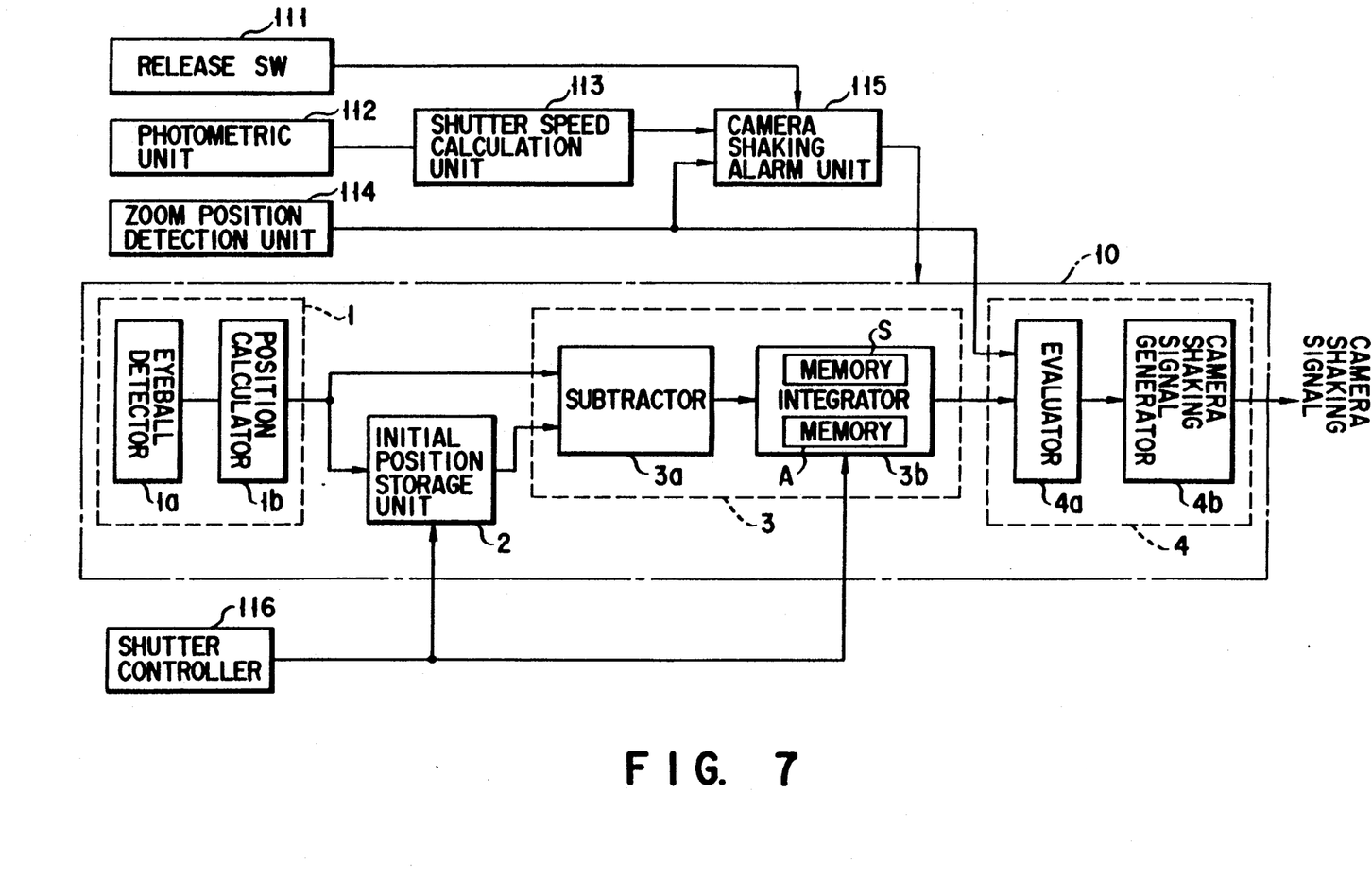
FIG. 7 is a block diagram showing an arrangement when the present invention is applied to a camera shaking alarming apparatus.

FIG. 7 shows an arrangement in which the camera shaking detection apparatus of the second embodiment of the present invention is applied to a camera shaking alarming apparatus for detecting camera shaking and alarming it to a user.

Only a portion associated with the gist of the present invention will be described below.

Referring to FIG. 7, reference numeral 10 denotes the camera shaking detection apparatus; 111, a release SW; 112, a photometric unit; 113, a shutter speed calculation unit for calculating a shutter speed on the basis of a photometric value from the photometric unit 112; 114, a zoom position detection unit for detecting a focal length f of a zoom lens; and 115, a camera shaking alarm unit. The camera shaking alarm unit 115 compares the shutter speed with a reciprocal value 1/f obtained by the focal length f and generates an alarm when the value of the shutter speed is larger than the reciprocal value 1/f, i.e., when the shutter speed decreases to a level which indicates a high possibility of camera shaking. At the same time, the camera shaking alarm unit 115 prepares for an operation of the camera shaking detection apparatus.

When the camera shaking alarm unit 115 generates a preliminary alarm, the camera shaking detection apparatus 10 is operated in synchronism with an opening operation of the shutter. The camera shaking detection apparatus 10 comprises the eyeball detection unit 1 constituted by an eyeball detector 1a and a position calculator 1b, the initial position storage unit 2, the subtracter unit 3 constituted by a subtracter 3a and an integrator 3b, and the evaluation unit 4 constituted by an evaluator 4a and a camera shaking signal generator 4b.

The eyeball detector 1a constituting the eyeball detection unit 1 measures the position of the pupil of an eyeball every predetermined time interval.

The position calculator 1b constituting the eyeball detection unit 1 obtains the position of the eyeball (eyeball position) relative to the camera in accordance with an output from the eyeball detector 1a.

The arrangement of the eyeball detector 1a will be described in detail later.

As previously described, the initial position storage unit 2 stores the position (initial position) of the eyeball when the shutter starts to be opened.

The subtracter 3a constituting the subtracter unit 3 obtains a difference between the present eyeball position and the initial eyeball position.

The integrator 3b constituting the subtracter unit 3 comprises a subtraction memory S for storing a subtraction result from the subtracter 3a and an integration memory A for storing an integration result. For example, a value from the subtraction memory S and a value from the integration memory A are added at a predetermined timing, and the sum is stored as the integration result in the integration memory A.

The evaluator 4a constituting the evaluation unit 4 evaluates a camera shaking amount at the focal length f during photography upon opening of the shutter on the basis of the integration result (i.e., an output from the subtracter unit 3) and a present vertical magnification $\beta$ of a lens focus group obtained by the focal length f from the zoom position detection unit 114. The camera shaking amount has a correlation with a circle of confusion on the film surface and therefore can be obtained by a product ($\beta \cdot A$) between the vertical magnification $\beta$ and the value of the integration memory A.

The vertical magnification $\beta$ is a value determined by lens design. When values of a vertical magnification $\beta$ corresponding to various focal lengths f are stored in the form of a table in an internal ROM of the CPU arranged in the camera body, the vertical magnification $\beta$ can be easily read out from the internal ROM.

The camera shaking signal generator 4b constituting the evaluation unit 4 compares the evaluation output ($\beta \cdot A$) from the evaluator 4a with a predetermined value k and generates a camera shaking signal in accordance with whether camera shaking adversely affects a photographic result.

Reference numeral 116 in FIG. 7 is a shutter controller for controlling the shutter opening operation in accordance with a shutter timer (not shown) and outputs a shutter opening signal for shutter control to the initial position storage unit 2 and the shutter opening signal and a shutter closing signal to the integrator 3b.

An operation of the above arrangement will be described below.

When the release SW is turned on, a photometric operation is performed in the photometric unit 112. The shutter speed calculation unit 113 calculates a shutter speed on the basis of this photometric value. In addition, the focal length f of the lens is obtained by the zoom position detection unit 114.

In the camera shaking alarm unit 115, the reciprocal value 1/f of the focal length f is compared with the shutter speed. If a possibility of camera shaking is determined in the camera shaking alarm unit 115, a preliminary alarm is output to the user. At the same time, a preparation instruction for operating the camera shaking detection apparatus 10 is output.

In this state, when the opening of the shutter is started, the initial position of the eyeball which is synchronously detected by the eyeball detection unit 1 is stored in the initial position storage unit 2. The present eyeball position is detected every predetermined time interval in accordance with the set time of the eyeball timer. At the same time, the subtracter unit 3 integrates the difference between the present position and the initial position stored in the initial position storage unit 2. This operation is repeated until the shutter is closed.

When the shutter is closed in accordance with the set time of the shutter timer, the evaluation unit 4 evaluates a camera shaking amount. That is, after the operation for detecting the eyeball position is completed, a camera shaking amount at the focal position f during photography is calculated on the basis of the integration result and the vertical magnification $\beta$ of the lens obtained from the focal length f.

This camera shaking amount is compared with the predetermined value k. If the camera shaking amount is larger than the predetermined value k, a camera shaking signal representing camera shaking is generated.

In this camera shaking alarm apparatus, a possibility of camera shaking is determined in accordance with the shutter speed and the focal length f of the lens prior to exposure, and a preliminary alarm is output to the user. During exposure, camera shaking detection is performed in accordance with a change in relative position between the eyeball and the camera. If camera shaking is determined to adversely affect the photographic result, an alarm is output to the user.

If camera shaking is expected to occur, the user can carefully take pictures. If camera shaking occurs even under this condition, necessity of taking a picture again can be easily determined.

Figure 8:
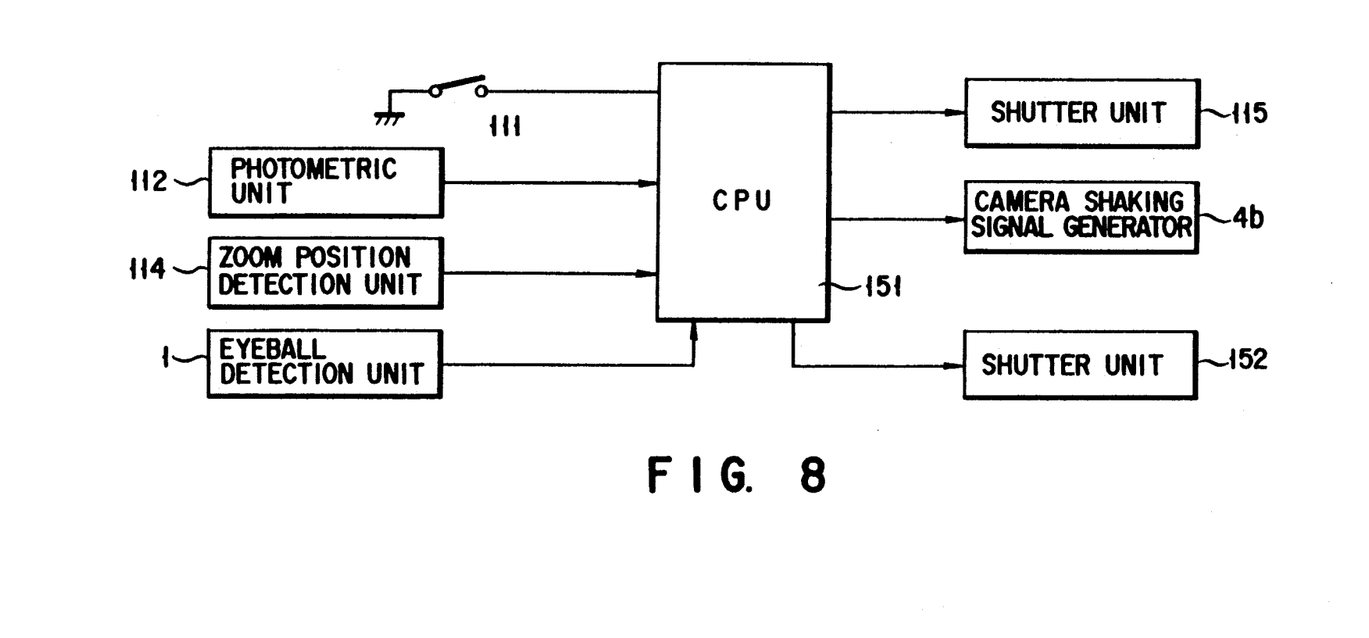
FIG. 8 is a block diagram showing an arrangement of the camera shaking alarming apparatus having a microcomputer as its main component.

FIG. 8 shows an arrangement of the camera shaking alarm apparatus having a CPU as a main component.

The camera shaking alarm apparatus can be realized using a microcomputer such as a CPU. In this case, the release switch 111, the photometric unit 112, the zoom position detection unit 114, the eyeball detection unit 1, the camera shaking alarm unit 115, the camera shaking signal generator 4b, and a shutter unit 152 for driving a shutter (not shown) are connected to a CPU 151.

Only the main part associated with the gist of the present invention is illustrated.

Figure 9A:
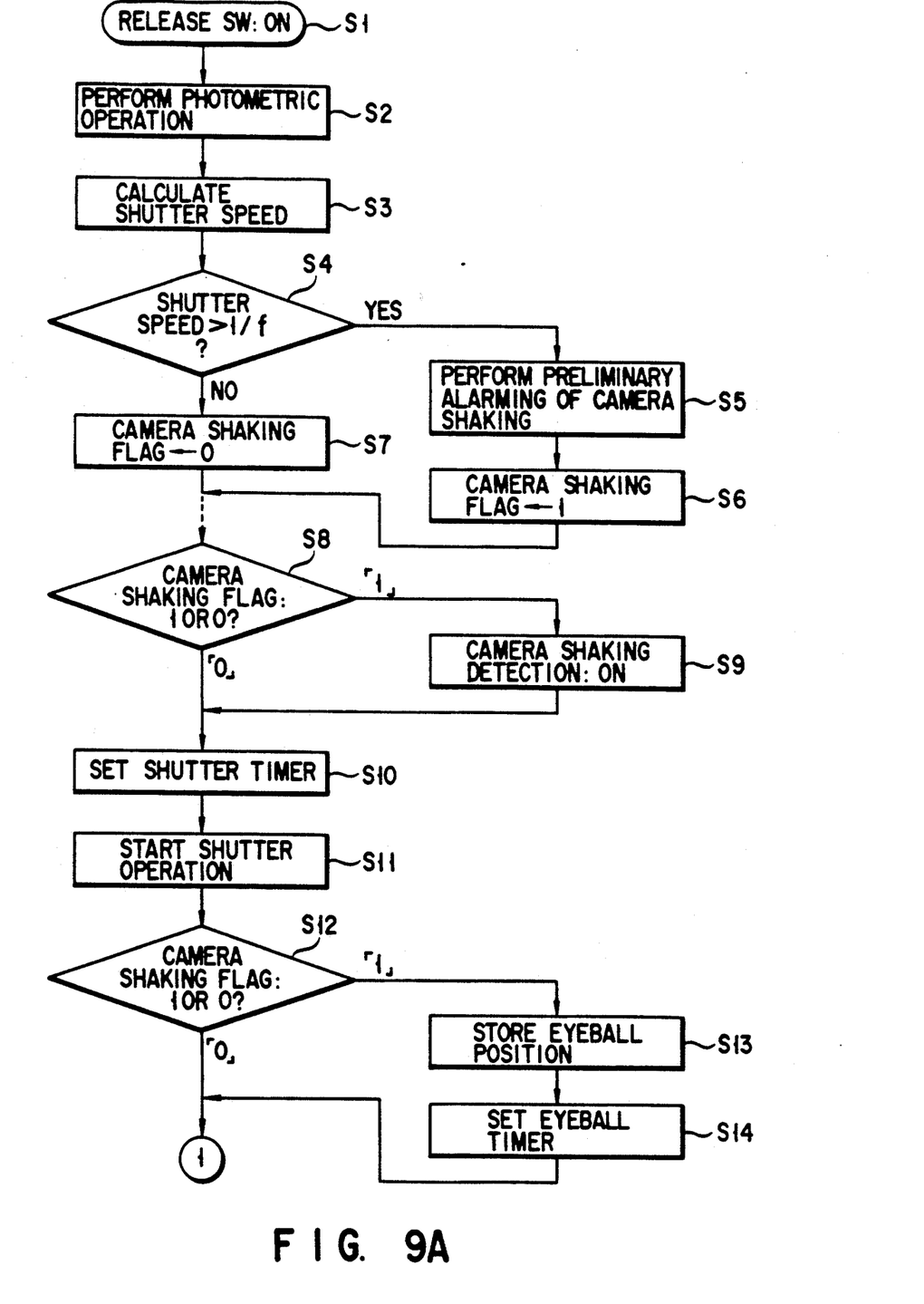
FIGS. 9A and 9B are flow charts for explaining an operation of the arrangement in FIG. 8.
Figure 9B:
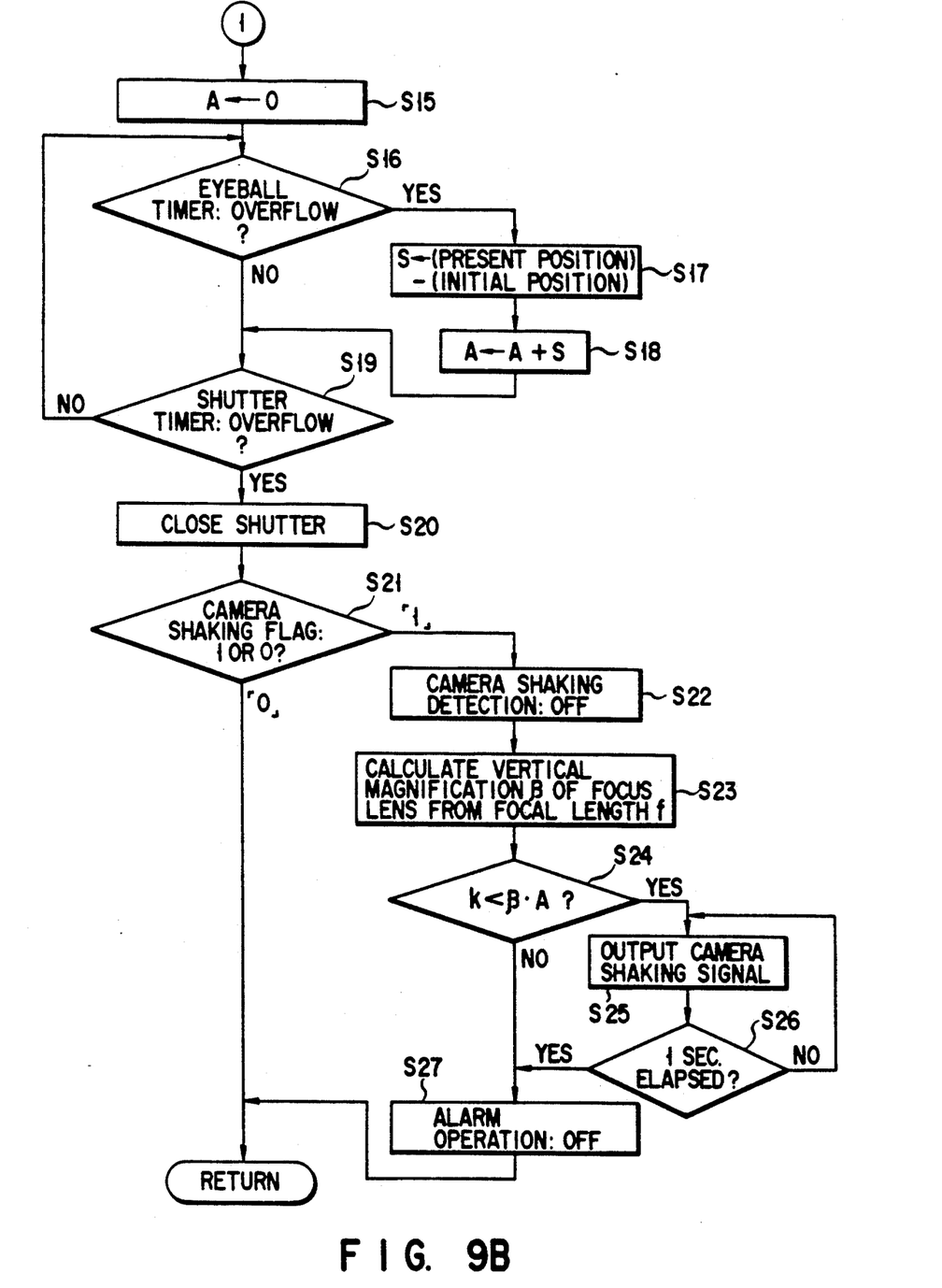

FIGS. 9A and 9B are flow charts for explaining an operation of the arrangement shown in FIG. 8.

Assume that the release SW 111 in FIG. 9A is turned on (step S1). A photometric value from the photometric unit 112 is fetched, and a shutter speed is calculated on the basis of this photometric value (steps S2 and S3).

The focal length f of the zoom lens which is detected by the zoom position detection unit 114 is fetched.

The reciprocal number 1/f obtained from this focal length f is compared with the shutter speed (step S4). If the value of the shutter speed is larger than the reciprocal value 1/f (i.e., (shutter speed) >1/f), the CPU 151 determines a high possibility of camera shaking. The camera shaking alarm unit 115 outputs a preliminary camera shaking alarm. At the same time, a camera shaking flag for operating the camera shaking detection apparatus 10 is set at "1" (steps S5 and S6).

If the camera shaking flag is set at "1", the camera shaking detection apparatus 10 is operated before the shutter is opened (steps S8 and S9).

when the shutter timer is set and the shutter unit 52 is controlled in accordance with the set time of the shutter timer, the shutter starts to be opened (steps S10 and S11). If the camera shaking flag is set at "1", a shutter opening signal synchronized with the start of the shutter operation is output, and the initial position of the eyeball is fetched from the eyeball detection unit 1 and is stored (steps S12 and S13). An eyeball timer for determining the interval of the detection operation of the eyeball detection unit 1 is set (step S14).

Referring to FIG. 9B, the integration memory A is cleared (step S15).

Until the shutter is closed, the present eyeball position measured every predetermined time interval set in the eyeball timer is fetched from the eyeball detection unit 1, and at the same time, a difference between the present eyeball position and the initial position is obtained and stored in the subtraction memory S (steps S16 and S17). The content of the subtraction memory S is added to the content of the integration memory A to obtain a sum, and the sum is stored in the integration memory A, thus performing integration (step S18).

As a result, the value of the integration memory A is small when the eyeball moves around the initial position. When camera shaking occurs such that the eyeball is separated from the initial position, the value of the integration memory A is large.

In this state, when the shutter is closed with an overflow of the shutter timer, and the camera shaking flag is set at "1", the position detection operation of the eyeball detection unit 1 is disabled, and the camera shaking amount is evaluated (steps S19 to S22). In this case, the present vertical magnification $\beta$ of the lens focus group is obtained from the focal length f detected by the zoom position detection unit 114 in advance (step S23). A product ($\beta \cdot A$) of the vertical magnification $\beta$ and the value of the integration memory A is obtained, and the camera shaking is evaluated, i.e., the occurrence of camera shaking is determined in accordance with whether the product is larger than the predetermined value k (step S24).

More specifically, when the product of the vertical magnification $\beta$ and the value of the integration memory A is larger than the predetermined value k ($k < \beta \cdot A$), camera shaking is determined, and a camera shaking signal is output from the camera shaking signal generator 4b (step S25). The camera shaking signal is kept output for a predetermined period of time, e.g., 1 sec. to alarm occurrence of camera shaking (sep S26).

When the alarm operation then ends and the camera shaking flag returns to the initial state "0", a series of operations are ended (step S27).

As described above, when shaking of the camera body occurs, the user can easily know it and can take a picture again to obtain an excellent photographic result free from camera shaking.

This embodiment will be described in more detail below.

Figure 10:
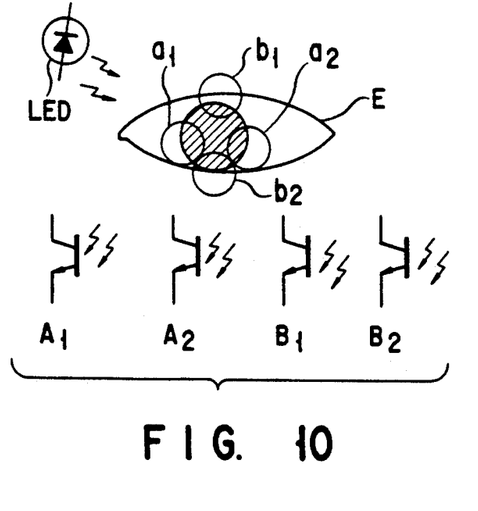
FIG. 10 is a view showing an arrangement of an eyeball detector.

FIG. 10 shows an arrangement of the eyeball detector 1a.

A light-emitting diode LED emits light on an eyeball E and its periphery. Phototransistors $A_1$, $A_2$, $B_1$, and $B_2$ receive light reflected by the portion of the eyeball E. In this case, the light-receiving ranges of the phototransistors $A_1$, $A_2$, $B_1$, And $B_2$ are defined as $a_1$, $a_2$, $b_1$, and $b_2$, respectively.

If the light-emitting diode LED emits, e.g., an infrared ray, the infrared ray does not dazzle the eye of the user and is not misunderstood as another display light in the camera body. When a light-emitting diode for emitting visible light is used, it can be a display light-emitting diode, thus providing an economical advantage. In particular, an in-focus display light-emitting diode which necessarily emits light may be used for this purpose.

Figure 11:
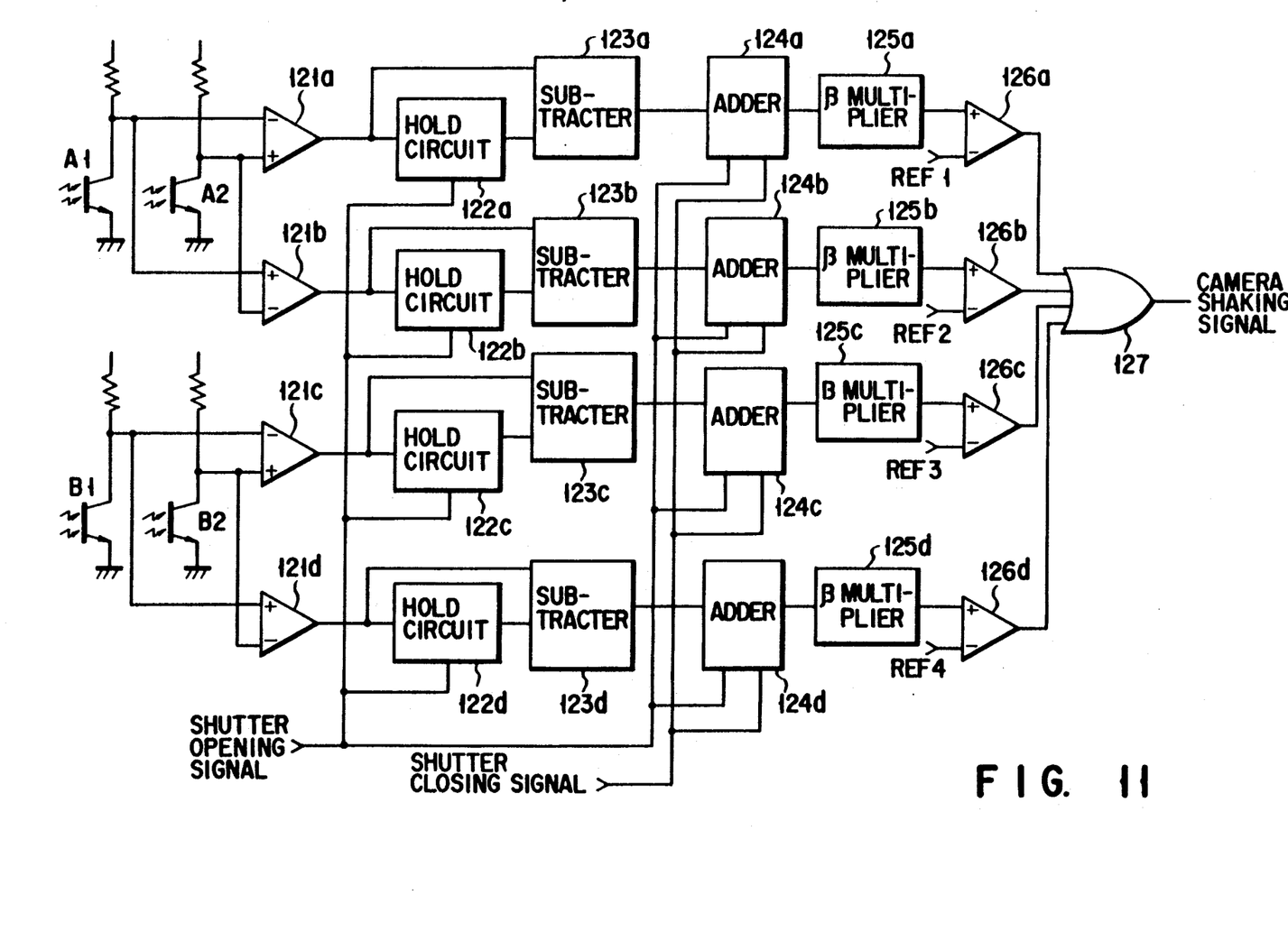
FIG. 11 is a circuit diagram showing an arrangement of the camera shaking detection apparatus arranged by hardware.

FIG. 11 shows a hardware arrangement of the camera shaking detection apparatus 10.

More specifically, the phototransistors $A_1$, $A_2$, $B_1$, and $B_2$ receive reflected light components in the light-receiving ranges $a_1$, $a_2$, $b_1$, and $b_2$, respectively, and photoelectrically convert these light components into electrical signals.

A differential amplifier 121a amplifies a difference $(-(A_1-A_2))$ of photocurrents photoelectrically converted by the phototransistors $A_1$ and $A_2$ and outputs the amplified signal to a hold circuit 122a or a subtracter 123a. Similarly, a differential amplifier 121lb amplifies a difference $(A_1-A_2)$ of the photocurrents photoelectrically converted by the phototransistors $A_1$ and $A_2$ and outputs the amplified signal to a hold circuit 122b or a subtracter 123b. A differential amplifier 121c amplifies a difference between the photocurrents of the phototransistors $B_1$ and $B_2$ and outputs the amplified signal to a hold circuit 122c or a subtracter 123c. Similarly, a differential amplifier 121d amplifies a difference between the photocurrents of the phototransistors $B_1$ and $B_2$ and outputs the amplified signal to a hold circuit 122d or a subtracter 123d. The position calculator 1b shown in FIG. 7 is constituted by the differential amplifiers 121a, 121b, 121c, and 121d.

The hold circuits 122a, 122b, 122c, and 122d correspond to the initial position storage unit 2 and respectively hold the outputs from the differential amplifiers 121a, 121b, 121c, and 121d in synchronism with the shutter closing signal, the outputs being obtained at this moment corresponding to the initial position of the eyeball E.

The subtracters 123a, 123b, 123c, and 123d correspond to the subtracter 3a and respectively compare the outputs from the hold circuits 122a, 122b, 122c, and 122d with the outputs from the differential amplifiers 121a, 121b, 121c, and 121d to calculate the difference between the present position and the initial position of the eyeball E.

Adders 124a, 124b, 124c, and 124d correspond to the integrator 3b and respectively add up differences between the present and initial positions of the eyeball E for every predetermined period of time from the supply of the shutter opening signal to the supply of the shutter closing signal, thereby performing the integration.

$\beta$ multipliers 125a, 125b, 125c, and 125d correspond to the evaluator 4a and respectively multiply the outputs from the adders 124a, 124b, 124c, and 124d with the vertical magnification $\beta$ to obtain the camera shaking amount at the focal length f in the photography.

Comparators 126a, 126b, 126c, and 126d compare outputs from the $\beta$ multipliers 125a, 125b, 125c, and 125d with reference values $REF_1$, $REF_2$, $REF_3$, and $REF_4$ serving as the predetermined value k, respectively. When the outputs from the $\beta$ multipliers 125a, 125b, 125c, and 125d exceed the reference values $REF_1$, $REF_2$, $REF_3$, and $REF_4$, the comparators 126a, 126b, 126c, and 126d determine camera shaking and output high-level signals.

An OR gate 127 outputs a camera shaking signal when a high-level signal is output from any one of the comparators 126a, 126b, 126c, and 126d.

The OR gate 127 and the comparators 126a, 126b, 126c, and 126d constitute the camera shaking signal generator 4b.

This embodiment exemplifies an arrangement using four phototransistors. However, the number of phototransistors can be changed in accordance with the required detection accuracy.

The pairs of circuits from the differential amplifiers are prepared for the phototransistors $A_1$ and $A_2$(this also applies to the phototransistors $B_1$ and $B_2$) to determine the absolute value of a change in camera position relative to the eyeball position. For example, if the output from the subtracter is an absolute value, single circuits may be used in place of the pairs of circuits.

Figure 12:
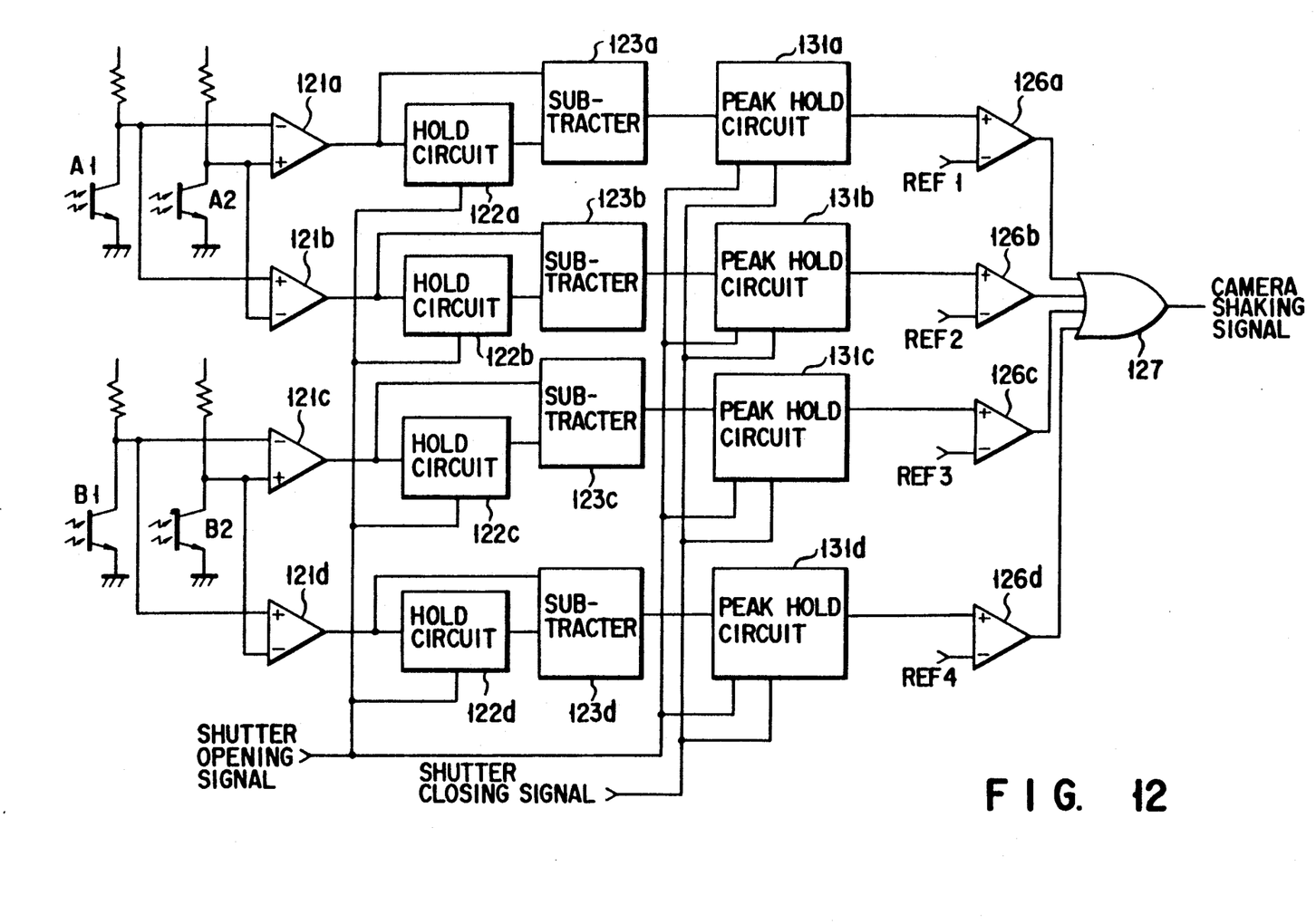
FIG. 12 is a circuit diagram showing another arrangement of the camera shaking detection apparatus arranged by hardware.

FIG. 12 shows an arrangement in which peak values of outputs from the subtracters 123a, 123b, 123c, and 123d shown in FIG. 11 are detected, and camera shaking is alarmed in accordance with the peak of a change in the position of the camera relative to the position of the eyeball E.

More specifically, the outputs from the subtracters 123a, 123b, 123c, and 123d are supplied to peak hold circuits 131a, 131b, 131c, and 131d, respectively.

The peak hold circuits 131a, 131b, 131c, and 131d respectively hold peak values of the outputs from the subtracters 123a, 123b, 123c, and 123d from supply of the shutter opening signal to the supply of the shutter closing signal.

The peak values held by the peak hold circuits 131a, 131b, 131c, and 131d are supplied to the comparators 126a, 126b, 126c, and 126d and are compared with the reference values $REF_1$, $REF_2$, $REF_3$, and $REF_4$ serving as the predetermined value k, as described above. Similarly, when one of the outputs from the comparators 126a, 126b, 126c, and 126d is set at high level, the camera shaking signal is output from the OR gate 127 because of a possibility of camera shaking.

In each of the embodiments shown in FIGS. 11 and 12, a change in photocurrent from a phototransistor may be utilized in accordance with a ratio of the white to the pupil of the eye or the ratio of the pupil to the skin around the eye within the light-receiving range of the phototransistor, thereby defining the correlation between the photocurrent and the positional relationship between the camera and the eyeball.

The positional relationship between the eyeball and the camera may be directly obtained by a charge-coupled device (CCD) or a sensor array such as a photodiode array.

Figure 13:
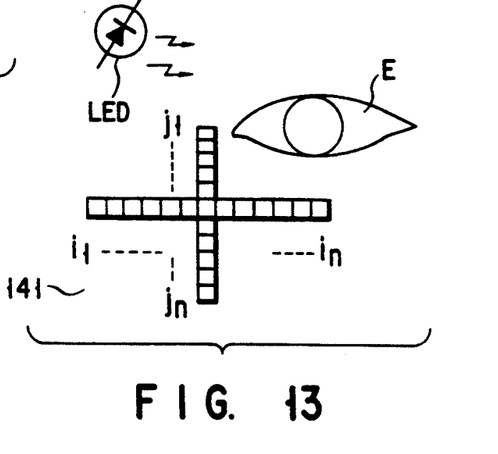
FIG. 13 is a view showing an arrangement of an eyeball detector for directly obtaining the camera position relative to the eyeball position by a sensor array.
Figure 14A:
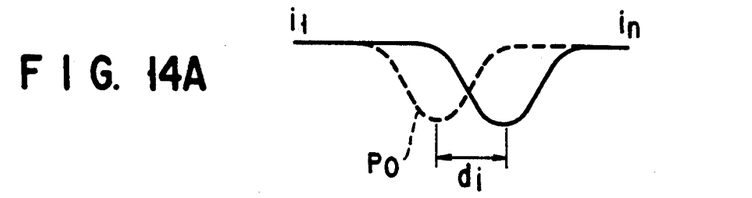
FIGS. 14A and 14B are views showing sensor data for explaining the operation of the eyeball detector.
Figure 14B:
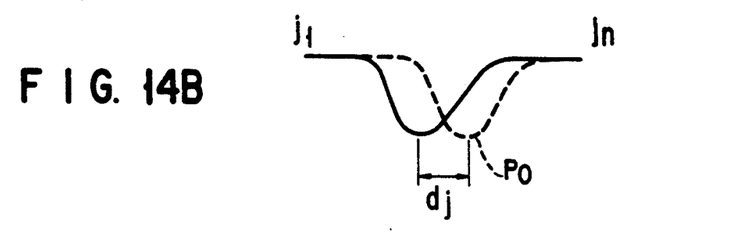

FIGS. 13 to 14B show an arrangement in which the position of the camera relative to the eyeball is directly detected by this sensor array.

As shown in FIG. 13, a light-emitting diode LED emits light on an eyeball E, and a sensor array 141 is arranged to receive light reflected by the eyeball E. In this case, the sensor array 141 is preferably arranged such that its light-receiving elements $i_1$ to $i_n$ and $j_1$ to $j_n$ form an almost crossed shape, and that light reflected by the eyeball E is incident on the intersection of the light-receiving elements when the user watches an object at the center of the finder.

Figure 15:
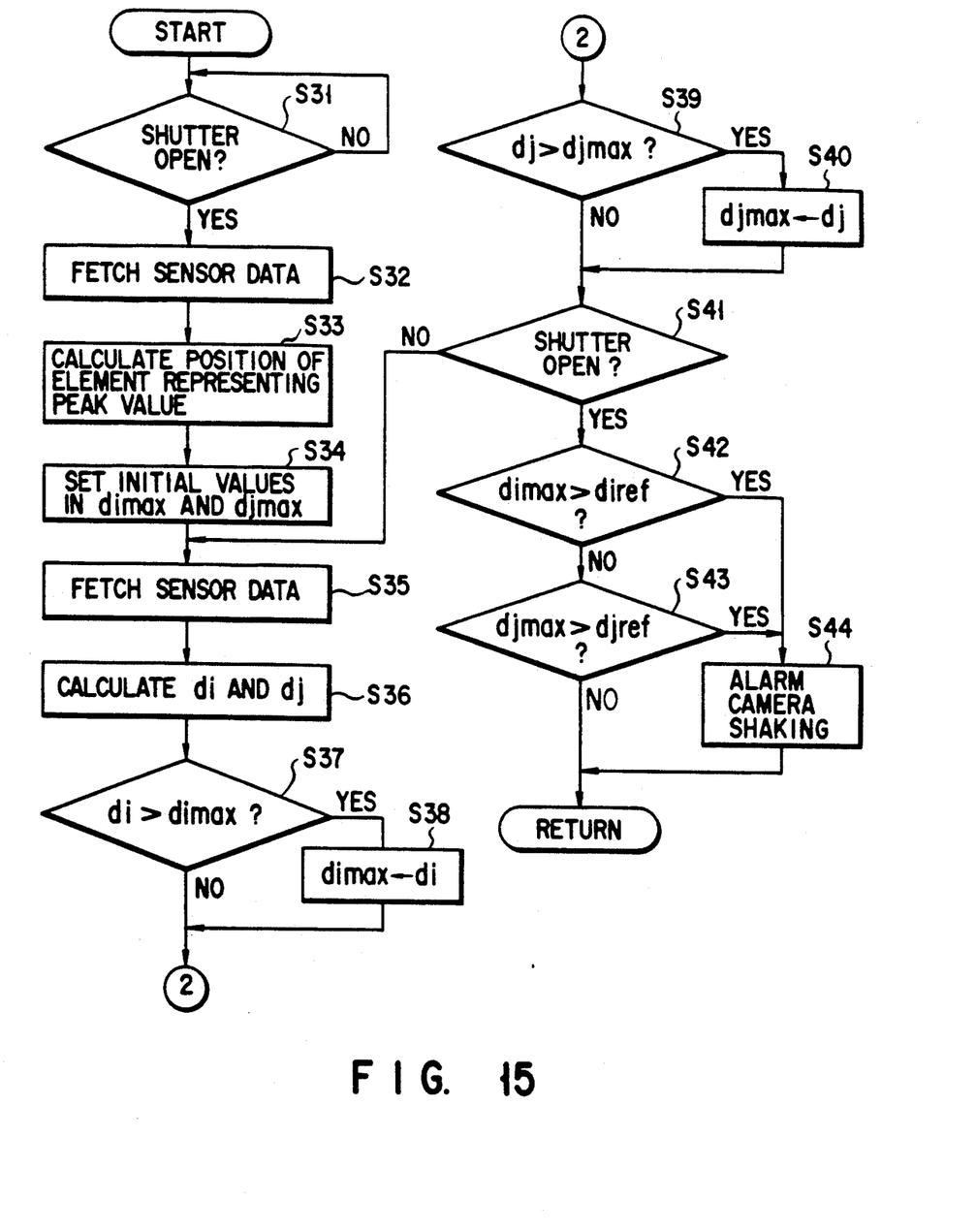
FIG. 15 is a flow chart for explaining an operation in the arrangement in FIG. 13.

FIG. 15 is a flow chart for explaining an operation of the above arrangement. In this case, an output from the sensor array 141 is fetched by a CPU (not shown) and is processed.

For example, when a shutter opening signal is input, the data from the sensor array 141 at this moment is fetched by the CPU (steps S31 and S32). The position of an element corresponding to the peak value is obtained from the sensor data and is stored (step S33).

In this case, the sensor data at the start of opening of the shutter is represented by a curve having a point $P_0$ as its peak value, as indicated by broken lines in FIGS. 14A and 14B, because the reflectance of the pupil of the eyeball E is low. Therefore, the peak position $P_0$ is almost at the center of the pupil of the eyeball.

After appropriate initial values are set in dimax djmax, sensor data is fetched again (steps S34 and S35). Differences between the peak position of the sensor data and the peak position $P_0$, i.e., change amounts di and dj shown in FIGS. 14A and 14B, are obtained (step S36).

The change amounts di and dj are compared with the set values dimax and djmax, respectively (steps S37 and S39). If the change amount is larger than the set value dimax (di > dimax), the set value dimax is updated to the change amount di (step S38). If the change amount dj is larger than the set value djmax (dj > djmax), the set value djmax is updated to the change amount dj (step S40).

The sensor data fetch operations are repeated until a shutter closing signal is input (step S41).

When a shutter closing signal is input, the set values dimax and djmax are compared with predetermined reference values diref and djref, respectively (steps S42 and S43). when the set value dimax is larger than the reference value diref (dimax > diref), or the set value djmax is larger than the reference value djref (djmax > djref), camera shaking is alarmed because of a possibility of camera shaking (step S44).

As described above, camera shaking is detected in accordance with a change in pupil position of the eyeball.

In the camera shaking detection apparatus of the second embodiment, a change in position of the camera body relative to the eyeball of the user is obtained, and this change amount is evaluated to determine a possibility of camera shaking. The camera shaking detection apparatus according to the present invention can stably and accurately detect camera shaking in accordance with a new technique free from the conventional drawbacks. Therefore, according to this camera shaking detection apparatus, shaking of the camera body during exposure can be accurately detected with a simple arrangement.

The camera shaking detection apparatus according to the present invention can be applied to a TTL (through the lens) AF camera, i.e., a camera in which the mirror is up in the shutter open state to guide light to the film surface, thereby detecting camera shaking during exposure.

Each embodiment described above exemplifies a camera for performing the photometric operation and the shutter speed operation upon a turn-on operation of the release SW. The present invention is also applicable to a constant photometric type camera in which the photometric operation and the shutter speed calculation are repeated regardless of the state of the release SW.

various changes and modifications may be made within the spirit and scope of the present invention.

According to the second embodiment of the present invention, as has been described above in detail, there is provided a camera shaking detection apparatus capable of accurately detecting camera shaking during exposure with a simple arrangement because the fact that the pupil of the eyeball is least susceptible to movement during the exposure is utilized.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A camera shaking detection apparatus comprising:
    light-emitting means, arranged in a camera body, for emitting light on part of a user's face;
    light-receiving means for receiving light emitted from said light-emitting means and reflected by the user's face; and
    detecting means for detecting shaking of said camera body on the basis of a change in photocurrent in said light-receiving means.

2. A camera shaking detection apparatus comprising:
    eyeball detecting means for detecting a position of an eyeball of a user; and
    camera shaking detecting means for detecting camera shaking on the basis of eyeball position information output from said eyeball detecting means.

* * * * *